(12) United States Patent
Hansen et al.

(10) Patent No.: US 9,779,388 B1
(45) Date of Patent: Oct. 3, 2017

(54) DISAMBIGUATING ORGANIZATION NAMES

(71) Applicant: LinkedIn Corporation, Mountain View, CA (US)

(72) Inventors: Axel R. Hansen, San Francisco, CA (US); Jonah L. Varon, San Francisco, CA (US); Nicholas A. Sinnott-Armstrong, Durham, NC (US); Shane S. Hill, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 390 days.

(21) Appl. No.: 14/565,165

(22) Filed: Dec. 9, 2014

(51) Int. Cl.
G06Q 50/00 (2012.01)
G06N 99/00 (2010.01)
G06Q 10/10 (2012.01)

(52) U.S. Cl.
CPC ............. *G06Q 10/10* (2013.01); *G06Q 50/01* (2013.01)

(58) Field of Classification Search
CPC ...................................................... G06N 99/00
See application file for complete search history.

(56) References Cited

PUBLICATIONS

B. Parr, "LinkedIn Gives Users the Ability to Follow Companies", http://mashable.com/2010/04/29/linkedin-follow-company, published Apr. 29, 2010, accessed Mar. 29, 2017 via https://web-beta.archive.org/web/20100828014640/http://mashable.com/2010/04/29/1inkedin-follow-company, 3 pages.*
Y. Wei et al., "Name Disambiguation in Person Information Mining", IEEE/WIC/ACM 2006 Int'l Conf. on Web Intel., 4 pages.*
S. Jonnalagadda and P. Topham, "NEMO: Extraction and normalization of organization names from PubMed affiliation strings", J. Biomedical Discovery and Collaboration, 2010, vol. 5, pp. 50-75.*
Han et al.; "CASIANED: Web Personal Name Disambiguation Based on Professional Categorization", WWW 2009.
Mann et al.; "Unsupervised Personal Name Disambiguation", Assoc. Computational Linguistics Proc. 7th Conf. of Natural Lang. Learn., vol. 4, 2003.
Treeratpituk et al.; Disambiguating Authors in Academic Publications using Random Forests:, ACM Proc. Joint Conf. on Dig Library 2009, pp. 39-48.

\* cited by examiner

*Primary Examiner* — Vincent Gonzales
(74) *Attorney, Agent, or Firm* — Park, Vaughan, Fleming & Dowler LLP

(57) ABSTRACT

A system, method, and apparatus are provided for disambiguating organization names. Selected names that are shared among multiple organizations may or may not be categorized or characterized (e.g., by industry, by size, by reach). As content items are received (e.g., news stories, magazine articles, social media content), occurrences of the selected names are identified. Each item that includes at least one name is processed to determine which of the multiple entities that have the name (if any) is the organization referenced or mentioned in the item. The same model may be applied to disambiguate all names or, depending on the name's categorization, different models or procedures may be applied to disambiguate the name.

20 Claims, 8 Drawing Sheets

|  | Feature 202 | Type 204 | Description 206 |
|---|---|---|---|
|  | *User Name Features 210* | | |
| 210a | Found_name | B | Was any form of the user's name found in item? |
| 210b | FirstName_count | D | Number of times the user's first name is found in item |
| 210c | LastName_count | D | Number of times the user's last name is found in item |
| 210d | FullName_count | D | Number of times the user's full name is found in item |
| 210e | TotalName_count | D | Number of times any form of the user's name is found in item |
| 210f | Name_ratio | F? | Ratio of occurrences of user's name to all names in item |
| 210g | Name_popularity | F | Commonality score of the user's full name |
|  | *User Affiliation Features 220* | | |
| 220a | School_mentioned | B | Was an educational affiliation of the user mentioned in item? |
| 220b | School_count | D | Number of times an educational affiliation of the user is found in item |
| 220c | Work_mentioned | B | Was a professional affiliation of the user mentioned in item? |
| 220d | Work_count | D | Number of times a professional affiliation of the user is found in item |
| 220e | TotalAffiliate_count | D | Number of times any affiliation of the user is found in item |
| 220f | UniqueSchool_count | D | Number of unique educational institutions found in item |
| 220g | UniqueWork_count | D | Number of unique professional affiliations found in item |
| 220h | TUAffiliate_count | D | Total number of unique affiliations found in item |
| 220i | MinAffil_likelihood | F? | For the rarest affiliation of the user found in item, the likelihood of that affiliation being mentioned |

B: Boolean (e.g., 0 or 1, T or F)  D: Discrete, not categorical (e.g., 0, 1, 2, ...)
C: Categorical (e.g., red, blue, green...)  F: Floating point or continuous
?: The corresponding feature may not be computed in some circumstances

Fig. 2A

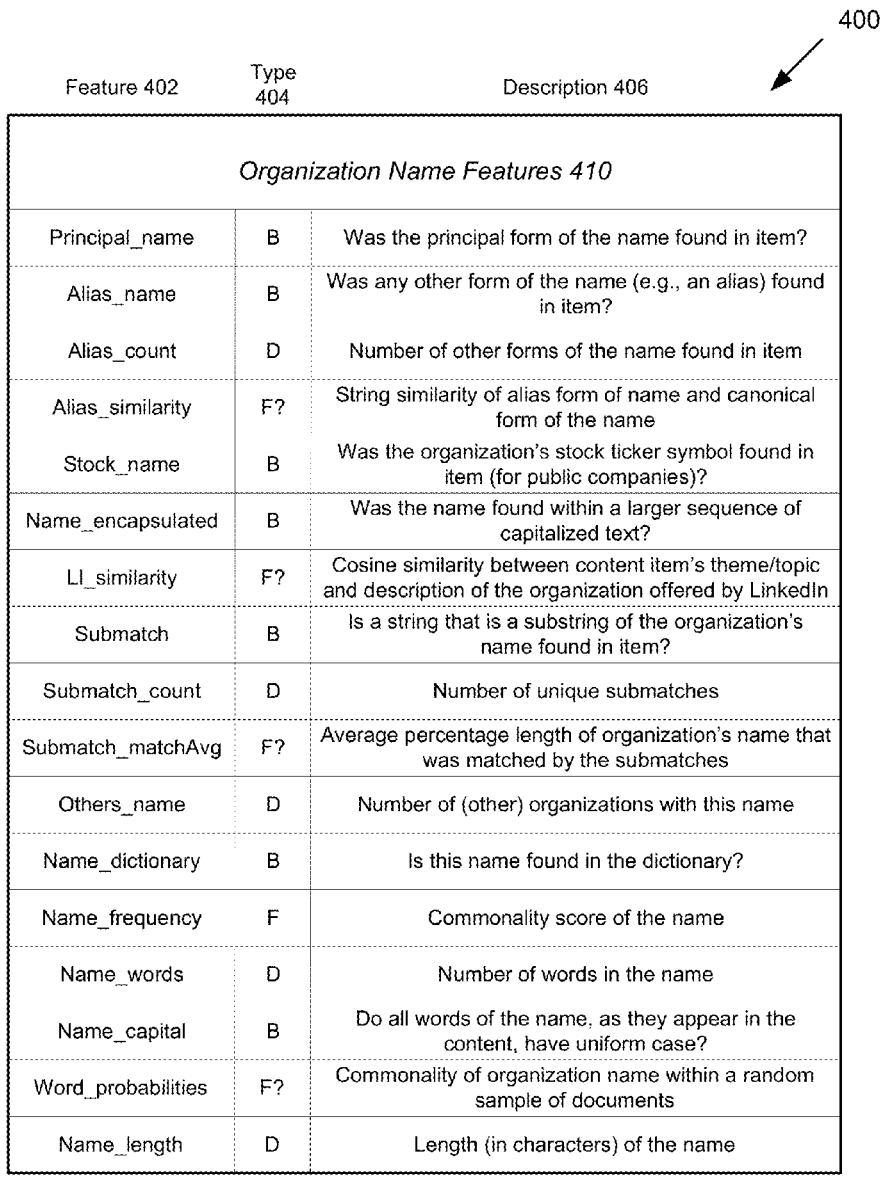

| | Feature 402 | Type 404 | Description 406 |
|---|---|---|---|
| | *Organization Name Features 410* | | |
| 410a | Principal_name | B | Was the principal form of the name found in item? |
| 410b | Alias_name | B | Was any other form of the name (e.g., an alias) found in item? |
| 410c | Alias_count | D | Number of other forms of the name found in item |
| 410d | Alias_similarity | F? | String similarity of alias form of name and canonical form of the name |
| 410e | Stock_name | B | Was the organization's stock ticker symbol found in item (for public companies)? |
| 410f | Name_encapsulated | B | Was the name found within a larger sequence of capitalized text? |
| 410g | LI_similarity | F? | Cosine similarity between content item's theme/topic and description of the organization offered by LinkedIn |
| 410h | Submatch | B | Is a string that is a substring of the organization's name found in item? |
| 410i | Submatch_count | D | Number of unique submatches |
| 410j | Submatch_matchAvg | F? | Average percentage length of organization's name that was matched by the submatches |
| 410k | Others_name | D | Number of (other) organizations with this name |
| 410l | Name_dictionary | B | Is this name found in the dictionary? |
| 410m | Name_frequency | F | Commonality score of the name |
| 410n | Name_words | D | Number of words in the name |
| 410o | Name_capital | B | Do all words of the name, as they appear in the content, have uniform case? |
| 410p | Word_probabilities | F? | Commonality of organization name within a random sample of documents |
| 410q | Name_length | D | Length (in characters) of the name |

B: Boolean (e.g., 0 or 1, T or F)   D: Discrete, not categorical (e.g., 0, 1, 2, ...)
C: Categorical (e.g., red, blue, green...)   F: Floating point or continuous
?: The corresponding feature may not be computed in some circumstances

Fig. 4A

| | Feature 402 | Type 404 | Description 406 |
|---|---|---|---|
| | \multicolumn{3}{c}{*Organization Name Features 410 (continued)*} | |
| 410r | Name_POS | C | What part of speech is the name as it appears in the content (e.g., noun)? |
| 410s | Domain_canonical | B | Does the organization's domain name match its canonical name? |
| 410t | Y_boss | D | Rank or position of organization's web site in list of sites found by searching for the name |
| 410u | Matches_average | F? | Average number of content items found to include the name of the organization (e.g., per week) |
| 410v | Name_begin | B | Was the name found at the beginning of any sentence of the item's content? |
| 410w | Name_beginNum | D | Number of times the name was found at the beginning of any sentence of the item's content |
| 410x | Name_end | B | Was the name found at the end of any sentence of the item's content? |
| 410y | Name_endNum | D | Number of times the name was found at the end of any sentence of the item's content |
| | \multicolumn{3}{c}{*Organization Affiliation Features 420*} | |
| 420a | Top_name | B | Were any names of top people of the organization mentioned in the item? |
| 420b | ItemIndustry_distance | F? | Graphical distance between an organization's industry and the content of the item |
| 420c | Related_found | B | Were names of any related organizations found in the item? |
| 420d | Site_found | B | Was a website of the organization found or linked to? |
| 420e | Site_familiarity | F? | Cosine similarity between item content and organization's website |
| 420f | Org_size | D | Size of organization (e.g., in employees) |
| 420g | Employee_similarity | F? | Cosine similarity of item content to content of items that mention an employee |
| 420h | Employee_industry | F? | Percentage of organization's employees engaged in the industry addressed in the content item |

B: Boolean (e.g., 0 or 1, T or F)  D: Discrete, not categorical (e.g., 0, 1, 2, ...)
C: Categorical (e.g., red, blue, green...)  F: Floating point or continuous
?: The corresponding feature may not be computed in some circumstances

Fig. 4B

DISAMBIGUATING ORGANIZATION NAMES

RELATED ART

The subject matter of this application is related to the subject matter in a co-pending non-provisional application by the same inventors as the instant application, which is entitled "Disambiguating Personal Names," has Ser. No. 14/565,158, was filed concurrently with this application, and is incorporated herein by reference.

BACKGROUND

This disclosure relates to the field of computer systems. More particularly, a system, apparatus, and methods are provided for disambiguating organization names.

Many names are shared among multiple organizations (e.g., businesses, not-for-profit entities, government agencies and departments, social organizations, professional groups, educational institutions). While the names of some famous businesses, agencies, and other organizations may correctly be assumed to refer to particular organizations, other names may be shared by myriad small businesses, local/state governments, educational institutions, etc. For example, the name of a restaurant or service provider may be used by many businesses in different cities within one county or state, as well as in different states and different countries.

This can make it difficult to determine whether a given reference—such as a mention of an organization in a news story—is to one particular organization that uses that name, instead of a different one.

DESCRIPTION OF THE FIGURES

FIGS. 2A-B list some features that may be applied to disambiguate a personal name, in accordance with some embodiments.

FIGS. 4A-B list some features that may be applied to disambiguate a name of an organization, in accordance with some embodiments.

DETAILED DESCRIPTION

Figure 1:
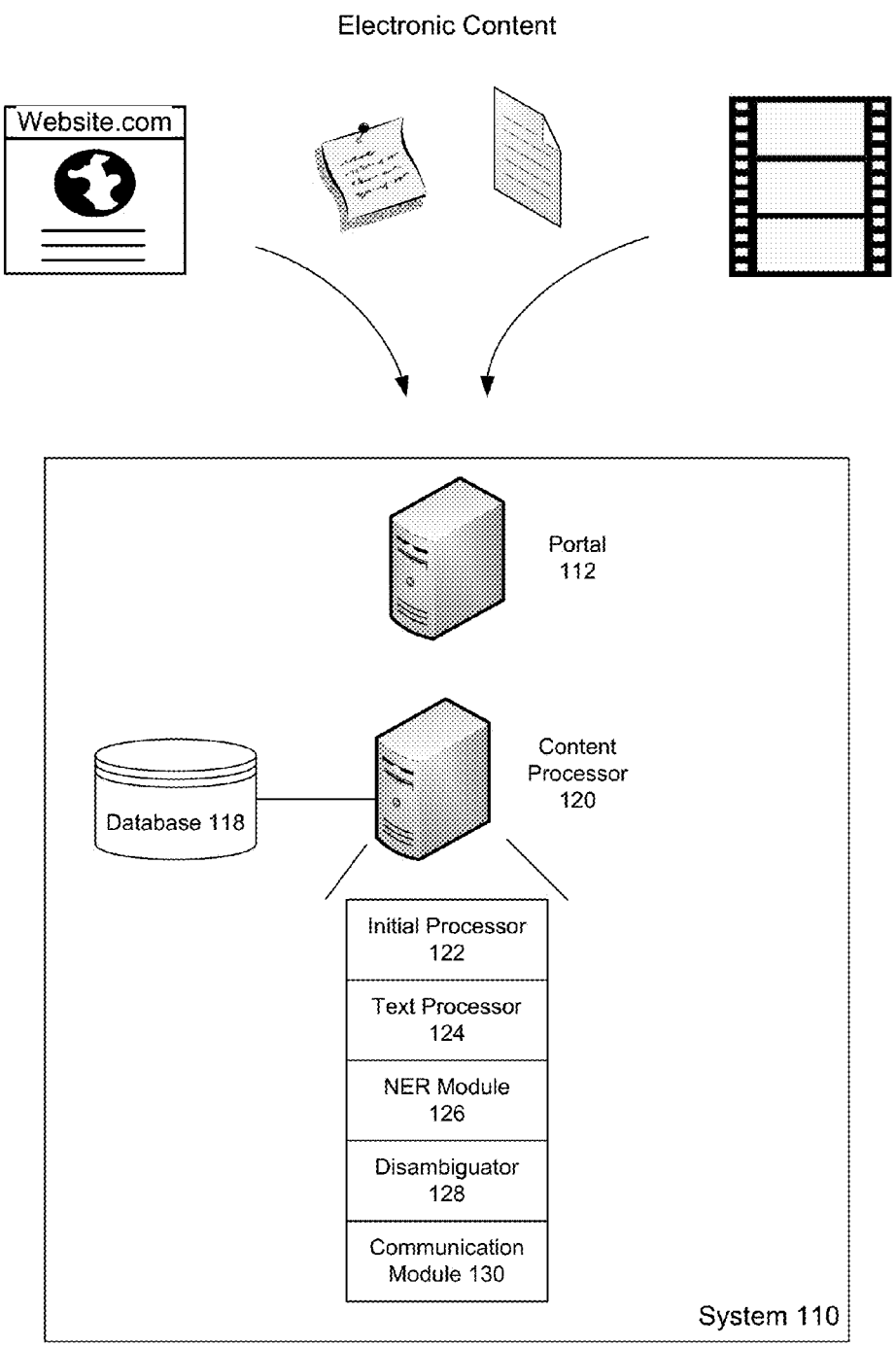
FIG. 1 is a block diagram of a system for disambiguating personal names within content items, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and/or apparatus are provided for disambiguating personal names, names of organizations, and/or names of other types of entities. In these embodiments, personal names (i.e., names of people) that are shared among multiple people are categorized or characterized as either famous or non-famous and, if non-famous, further characterized as common or uncommon. Names of other types of entities may or may not be partitioned or divided into categories.

As content items are received (e.g., news stories, magazine articles, messages, social media content), instances of selected names that appear in the items are identified. Each content item that includes at least one name is then processed to attempt to determine which of the multiple people/organizations/other entities that share an identified name is the one that is referenced in the item. Depending on a name's categorization (e.g., famous, non-famous and common, non-famous and uncommon), different models or procedures may be applied to disambiguate an occurrence of the name among the multiple candidates.

In some implementations, feature vectors representing the multiple candidates are assembled based on content of the item and then applied to the appropriate model. Output of a model for a particular vector representing a candidate may be a binary value indicating whether that candidate is the correct one, a score indicating a level of confidence as to whether that candidate is the correct one, and/or some other indication that allows the (most likely) correct candidate to be identified.

Disambiguating Personal Names

In some embodiments, personal names encountered in electronic content items (e.g., stories, articles, documentaries, social posts, audio) are disambiguated among multiple people having the same name in at least one form. For example, two people may be considered to share a personal name even if they have different middle names or different middle initials, if they have the same last name but related or similar first names (e.g., Robert and Bob, Steven and Stephen and Steve), or if they otherwise have names that can differ in one or more forms but that can also appear similar or identical in at least one form. As a further example, disambiguating a personal name that appears as a first initial and a last name, or as a first name and last initial, may require consideration of people who ordinarily would not be considered to have the same name, but who do share an initial.

In some implementations of these embodiments, personal names are disambiguated so that content items that mention or refer to a person can be identified with confidence. Such items may then be provided to that person and/or anyone else who has expressed an interest in receiving news stories, articles, posts, and/or other content that references the person.

FIG. 1 is a block diagram of a system for disambiguating personal names within content items, according to some embodiments.

In these embodiments, one or more types of electronic content are received at system 110 and processed by portal 112. The content may include documents, audio files, multimedia files, and/or other forms of content. Portal 112 may be or may include software and/or hardware modules for receiving any compatible type of content, and possibly for performing some initial processing.

For example, portal 112 may include an RSS (Really Simple Syndication) crawler for receiving or retrieving content from RSS feeds, or a server for receiving documents (e.g., a web server, a data server, a file server), and may decrypt and/or decompress electronic files, may examine content for malicious components (e.g., viruses, worms, spam), may exclude content of particular forms, types, or natures, and so on.

Database 118 stores personal names for which content received at system 110 will be searched, program code executable by hardware components of system 110 to perform actions described herein, data used by the hardware components to process content and communicate with external entities, other data mentioned herein, and/or other information that may facilitate and/or support operation of the system.

Content processor 120, according to these embodiments, includes initial processor 122, text processor 124, Named Entity Recognition (NER) module 126, disambiguator 128, and communication module 130, which may comprise software and/or hardware configured to perform the functions described herein. Although only one instance or copy of each system component is illustrated in FIG. 1, in some embodiments multiple instances of any or all components may be employed.

Initial processor 122 processes some or all content items to ensure information contained in the items has (or is transformed into) a format acceptable to other components of the content processor. For example, the initial processor may parse content formatted in HTML (HyperText Markup Language), PDF (Portable Document Format), MPEG, XML (eXtensible Markup Language), SMTP (Simple Mail Transfer Protocol), POP (Post Office Protocol), and/or other languages or formats in order to identify an author, producer, or other source of a content item. In some cases, this information may be readily extractable from metadata that accompanies an item, or may be known based on the manner in which it was received, a network address at which or from which it was received, etc., but in other cases the item may need to be parsed or examined in order to identify the source. Some content items may be received without any source identification, or the source may not be extractable from some items.

Text processor 124 produces textual forms of content items received by the system. The text processor may simply extract text from some electronic documents (e.g., news articles, magazine articles, blog posts, electronic mail messages), but may also or instead perform audio-to-text conversion, optical character recognition, and/or other processing in order to reduce information within a content item to textual form. Some text may be discarded (e.g., publication information, navigation links, boilerplate text) in order to focus on the body of a content item.

Within the text produced by text processor 124, NER module 126 identifies personal names and/or names of locations, organizations (e.g., companies), points of interest, and/or other entities. For example, database 118 may store a collection of personal names tracked or monitored by system 110, and NER module 126 will scan the text associated with compatible content items received by the system (e.g., items that include text or that include information reducible to textual format) for those personal names. As one alternative, the NER module may scan a content item's text to identify patterns that may be names, and compare those patterns to the collection of names stored in database 118.

Each targeted or selected personal name may be saved in one or more formats (e.g., full name, shortened name, nickname), which NER module 126 will search for, or the NER module may be configured to automatically search for known or possible variations of a target personal name (e.g., with middle initial, without middle name or initial, with first initial instead of first name).

A content item that is scanned by NER module 126 without success, meaning that the item does not contain any personal name tracked or monitored by system 110, may be discarded without further processing.

Disambiguator (or disambiguation module) 128 disambiguates an occurrence of a target personal name, found within a content item by NER module 126, among multiple people having that name. As discussed below, the disambiguator may employ different processes or models to perform its disambiguation, depending on the form of the name, the type of name (e.g., famous or non-famous), and/or other factors.

Communication module 130 forwards content items, links to content items, extracts, and/or synopses of content items to selected recipients, depending on the disambiguation performed by disambiguator 128. For example, after the disambiguator identifies a specific person referenced or identified in a content item, the communication module will make the item available (or at least some portion of the item) to anyone who requested receipt of content that references or identifies that specific person, via electronic mail, instant message, web site, mobile app, and/or other means.

Content processor 120 and database 118 are periodically or regularly updated as requests are received to track or monitor additional names, remove names that are no longer to be tracked, modify the model or process for disambiguating names, and/or for other purposes.

Functionality of system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal 112 and content processor 120 may alternatively be implemented as separate software modules executing on one or more computer servers. Thus, although only a single instance of a particular component of system 110 may be illustrated in FIG. 1, it should be understood that multiple instances of some or all components may be utilized.

When monitoring of a particular personal name is to commence, the name is categorized or characterized appropriately. In some embodiments, a first categorization involves characterizing a name as either famous or non-famous. In some implementations of these embodiments, a famous name is a name that is mentioned (in a specific form and/or in appropriate variations of forms) in content items received at system 110 at least a threshold number of times within a predetermined time period. For example, a name may be considered famous if it is found at least 5,000 times within content items received at the system over the previous month or 30-day period, possibly including items that are repeats of other items (e.g., a news story received via multiple feeds). In other implementations, other time periods and other threshold numbers of occurrences may be implemented. The system may store content items, text derived from content items, names of people and/or other entities found in the content items, and/or other information, for some period of time (e.g., one month, one year).

In some embodiments, non-famous names are further categorized as either common or uncommon. In some implementations, a non-famous personal name is considered uncommon unless the system is tracking more than a threshold number of people with the name. For example, a name may be considered common if the system is tracking more than three people with the name.

In these implementations, each non-famous name is assigned a commonality score to indicate how common it is. Illustratively, a name's commonality score may be equivalent or proportional to the number of tracked people that have the name, may be normalized over the number of people tracked, or may be otherwise manipulated to yield a useful value.

In other implementations, characterization of names as either common or uncommon considers the first name and last name (and possibly middle name or initial) separately. For example, when a request is received to track the name Robin Williams, a first commonality score may be assigned to the first name 'Robin,' and a second commonality score may be assigned to the last name 'Williams.' The overall commonality score of 'Robin Williams' might then be equal to the product of the two scores or may be otherwise derived from the two scores.

The latter implementations may assist the disambiguation of an occurrence of a personal name when only the first or last name is used in a content item (e.g., after referring to the full personal name). For example, after mentioning 'Robin Williams,' a content item may go on to refer to 'Mr. Williams,' 'Williams,' 'Robin,' and/or other shortened versions of the name 'Robin Williams.'

As another example, while the individual first and last names of 'John' and 'Smith,' respectively, may be very common, and produce a high commonality score for the name 'John Smith,' the separate commonality scores may also affect the categorization of names such as 'John Adams' and 'Robert Smith.'

Thus, a name tracked by system 110, in some embodiments, may be categorized as (a) famous, (b) non-famous and common, or (c) non-famous and uncommon. A name may migrate from one category or characterization to another if it is mentioned frequently enough (e.g., to make it 'famous') or if the number of people tracked with the same first and/or last names increases (or decreases) sufficiently to make the name common (or uncommon) among tracked names.

In some embodiments of system 110 of FIG. 1, hundreds of millions of names may be monitored or tracked (e.g., approximately 300 million). About 1% of them may be deemed famous at a given time, and the rest may be divided approximately equally between the common and uncommon categories of non-famous names. Of course the number of monitored or tracked names, and their distribution among applicable categories, may differ widely from one embodiment to another.

In some embodiments, an occurrence of a non-famous name is disambiguated using one machine-learning model for common names, and a different one for uncommon names. For example, common names may be disambiguated using a decision tree that may be hand-tuned, while uncommon names may be disambiguated using a supervised learning random forest model. In other embodiments, virtually any machine-learning models capable of classifying content items may be applied for either category of non-famous name, particularly supervised models. Other possibilities thus include an artificial neural network, a support vector machine, a symbolic machine learning algorithm, a rotation forest, and any other classification algorithm that can provide disambiguation quickly (e.g., in near real-time).

An illustrative training set employed in one or more machine-learning models in some embodiments may include approximately 15,000 textual content items that mention or identify approximately the same number of unique non-famous names. The same or different training sets may be used for different models. In some implementations, elements of a training set are labeled manually by a system operator or analyst, or are labeled via a crowdsourcing application.

Feature vectors of machine-learning models used for disambiguating common names and/or uncommon names may employ features that overlap, but in current embodiments they differ to some extent. As one of ordinary skill in the art will appreciate, for each known person having a personal name found in a content item, a separate feature vector may be assembled and fed to the selected model.

At least some features attempt to disambiguate a personal name based on information within a content item that accompanies a personal name, such as a name of an affiliated entity (e.g., a person, an organization or institution, a hobby or interest), a social aspect (e.g., how many friends are mentioned), factors common to other content items that were deemed to mention (or not to mention) a particular person with the personal name, etc. Other features focus on the form or structure of the content item, in terms of how often the name occurs, the form of the name, distance between the name and other aspects (e.g., affiliated entities) in terms of words or characters, and so on.

Figure 2B:
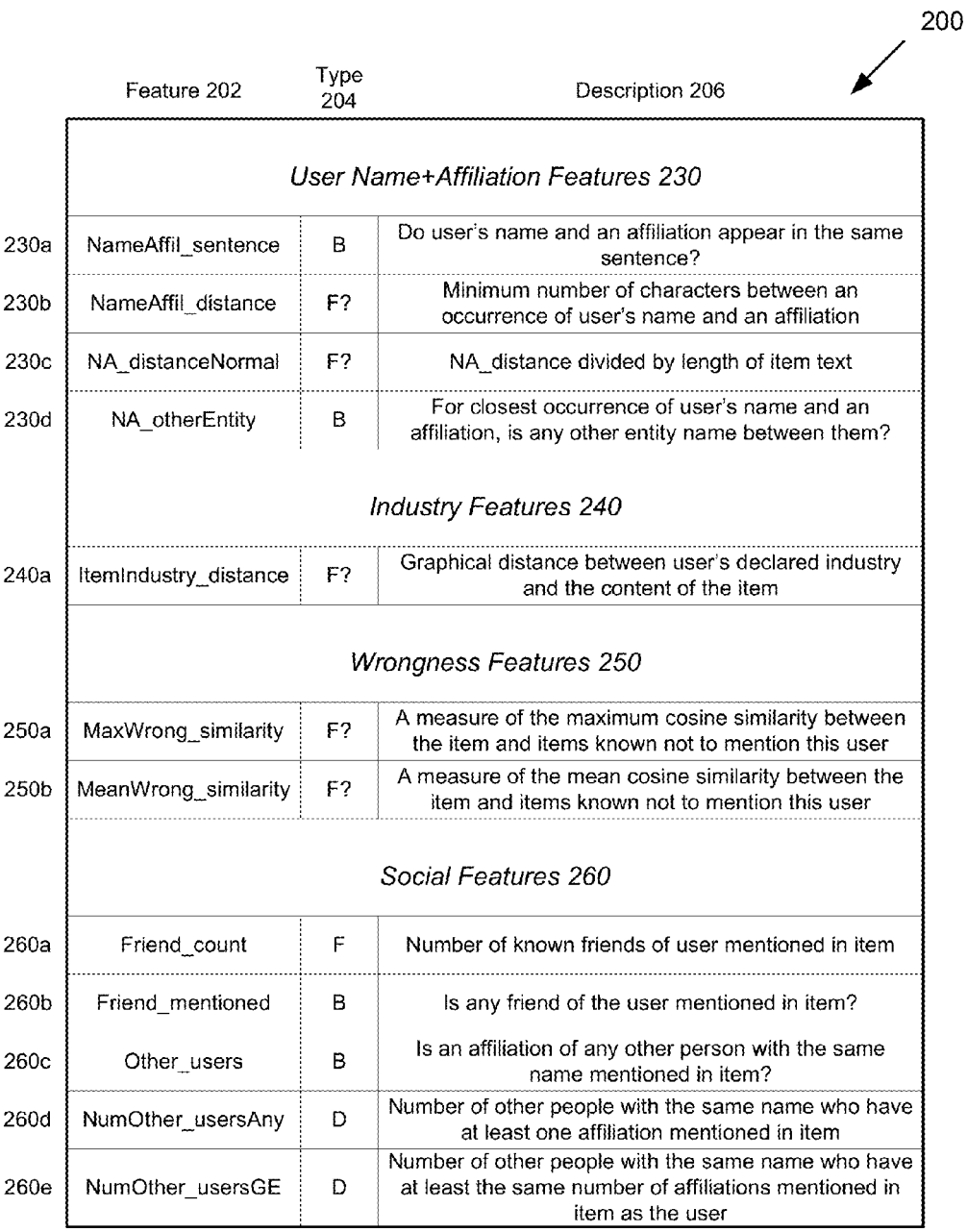

FIGS. 2A-B list some features that may be applied to disambiguate a personal name, according to some embodiments. Not all of the listed features need be included in every feature vector submitted to a machine-learning model used to disambiguate a name, and different subsets of the features may be used with different models. Other features not listed in FIGS. 2A-B may be employed without departing from the scope of the invention. The illustrative features therefore are not exhaustive.

The features illustrated in FIGS. 2A-B are divided into various categories or families, and table 200 includes columns for feature name 202, type (i.e., data type) 204, and description 206. A legend is provided to explain the different data types. In some embodiments, feature vectors comprising a subset of the illustrated features are assembled for each of multiple personal names (e.g., all names being tracked), and then submitted for each name to the model assigned to disambiguate that name (e.g., based on the name's categorization).

References to a 'user' in FIGS. 2A-B concern a personal name for which the content item is being processed (i.e., to determine whether the item refers to or mentions a specific person having that name). Thus, the term 'user' may be used to refer to an undetermined person having a name that may need to be disambiguated.

User name features 210 encompass features associated with a personal name found in a content item, such as whether the name of a specific person is found (Found_name 210a). Because a content item may be processed for each of multiple names (e.g., all tracked names), this feature may allow a model to immediately determine that a particular name is not mentioned (e.g., in any form), and that it need not continue trying to disambiguate that particular name. Other features in this category include the number of times the first name, last name, full name, and any form of the name of a person is found (FirstName_count 210b, LastName_count 210c, FullName_count 210d, TotalName_count 210e). Name_ratio feature 210f may be a fraction (or the floating point equivalent) indicating the number of times the person's name is mentioned, compared to all instances of personal names within the item.

Name_popularity feature 210g may be the commonality score of the person or name being considered, or some other measure of the name's popularity (or commonness). As the legend indicates, this feature may be a floating point number or may not be computed (e.g., if the name isn't mentioned—as indicated by Boolean feature Found_name 210a).

User affiliation features 220 encompass features related to entities affiliated with the person or name for which the content item is being processed; these entities may be referred to as "affiliations" of the person. Different people that share a name will usually have at least one difference in their affiliations. Illustratively, different Boolean features such as School_mentioned 220a and Work_mentioned 220c provide threshold indications of whether particular types of affiliations are mentioned in the content item. Similar features may be employed for other types of affiliations (e.g., friends, relatives, hobbies, professional and/or social organizations). School_count feature 220b and Work_count feature 220d indicate the total number of times each of these affiliations of the person are mentioned.

Because the name of an affiliation may be misspelled, abbreviated, shortened, or some alternative form may be used (e.g., "Acme," "Acme Inc.," "Acme company"), the process of generating affiliation features 220 may consider various forms or formats of an affiliation's name, similar to the manner in which multiple forms of one personal name may be conflated. Also, matches of affiliation names, personal names, and/or names of other entities need not be exact; it may be sufficient that some percentage of a name (e.g., 80%) be found, or that the root word or phrase of the name be found, in order to declare a match.

Ancillary user affiliation features 220e, 220f, and 220g provide other values indicating total number of affiliations of a person that has a name found in the content item, and of specific types of affiliations. TUAffiliate_count feature 220h identifies the total number of unique affiliations of the person named in the content item. MinAffil_likelihood feature 220i is a measure of the likelihood (e.g., the log of the likelihood) that one affiliation of the person (specifically, the affiliation shared with the smallest number of other people) is mentioned, compared to all affiliations of the person mentioned in the item.

User name+affiliation features 230 include features that indicate whether a specific name is mentioned in the same sentence as any affiliation of people having that name (NameAffil_sentence 230a) and whether any other entity is named between the closest occurrences of the specific name and any affiliation of a person having that name (NA_otherEntity 230d). This family of features also identifies the minimum character distance between a name and an affiliation of a person with that name (NameAffil_distance 230b), and a normalized measure of this distance (NA_distanceNormal 230c).

Industry features 240 include ItemIndustry_distance feature 240a, which measures a graphical distance between the person's declared industry and an industry or topic of a content item. In some embodiments, system 110 of FIG. 1 and the methods described herein are implemented by a professional social networking system such as that provided by LinkedIn® Corporation, and the person may be a member or user of the system, in which case he or she identified his or her industry, or identified his or her employer, which was mapped to an industry. Also, some or all content items may be processed to identify the industry or industries implicated in the content item or the industry or industries most closely related to the item's theme or topic.

Wrongness features 250 include MaxWrong_similarity 250a and MeanWrong_similarity 250b, which measure the maximum and mean cosine similarities between the current content item and some or all other content items known not to mention the specific person having the name that is currently being disambiguated. In some embodiments, for each of some or all tracked persons, the system retains copies or indicia of content items known to and/or not to mention the person. For these purposes, a stemmed, cleaned bigram vector space model may be applied.

Social features 260 indicate whether any friend of a person whose name is currently being disambiguated is mentioned in the current content item (Friend_mentioned 260b) and identifies the total number of known friends of this person that are mentioned (Friend_count 260a). These features may leverage social information provided by the person to a (professional) social networking system or site.

This category also indicates whether any affiliation of any other person with the name being disambiguated is also mentioned in the item (Other_users 260c), and identifies the number of other people with this name who have at least one affiliation mentioned in the item (NumOther_usersAny 260d), and the number of other people with this name who have at least the same number of affiliations mentioned in the item as the person currently being considered (NumOther_usersGE 260e).

As the features of table 200 of FIGS. 2A-B indicate, when a feature vector is assembled for a particular content item and a particular name to be disambiguated, that vector may reflect not just relationships between a particular person and the content of the item, but also relationships between that content and other people having the same name. In other embodiments, for disambiguating names of any type of entity, yet other types of features may be employed, which may be related to a particular content item (e.g., publisher, author), the publication or other source of the item (e.g., title, theme, reach), subscribers who receive the content item (e.g., their demographics), etc.

Figure 3:
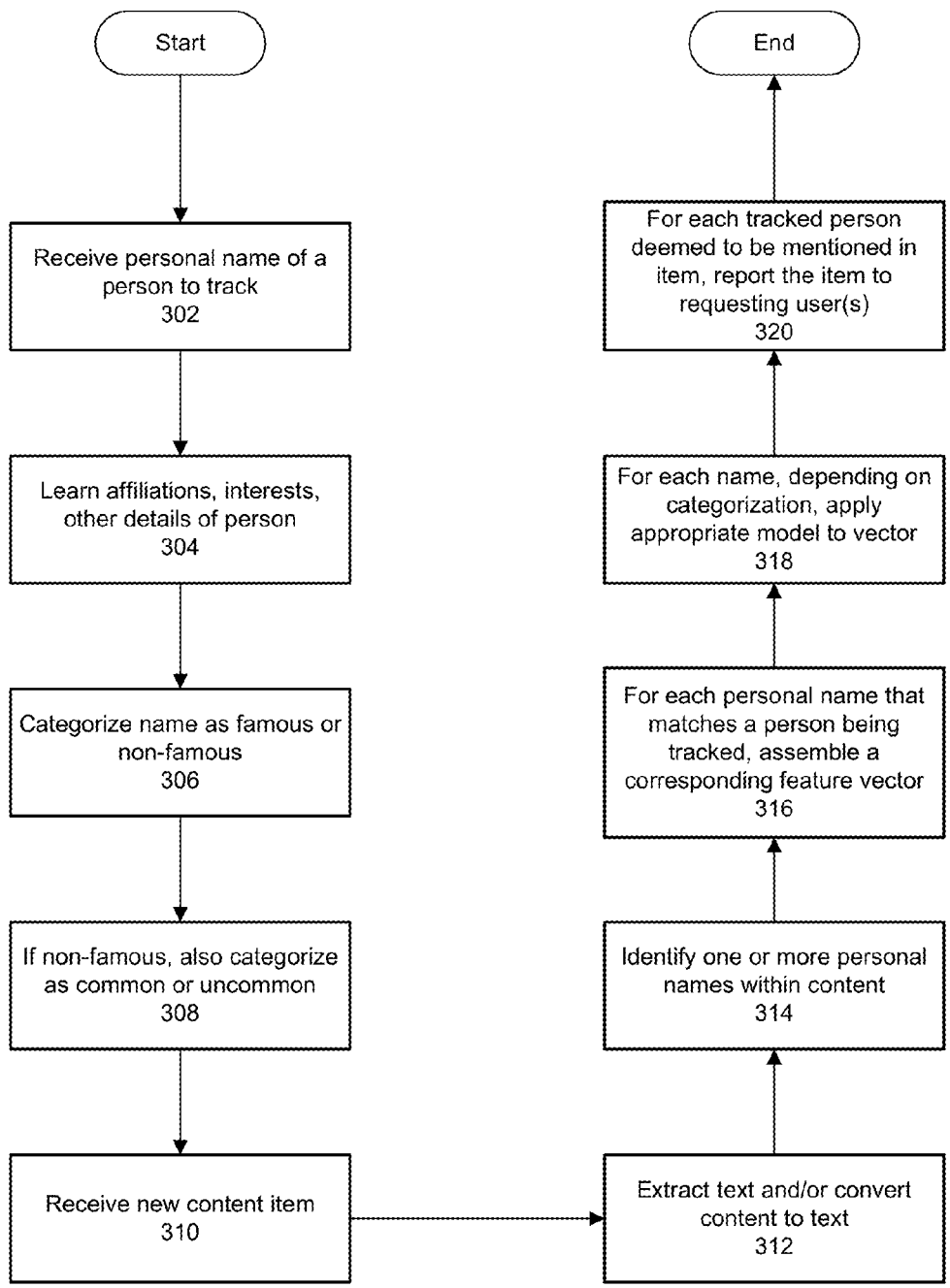
FIG. 3 is a flow chart demonstrating a method of disambiguating a personal name, in accordance with some embodiments.

FIG. 3 is a flow chart demonstrating a method of disambiguating a personal name, according to some embodiments. In the illustrated method, a personal name that appears in an electronic content item is disambiguated to identify, among multiple people that have the name, one particular person that is referenced by or intended to be identified in the item. In other words, the disambiguation process allows the system to identify the specific person that has the personal name and that the item concerns.

In other embodiments, the illustrated operations may be performed in a different order, one or more operations may be omitted, some operations may be merged or further divided, and/or one or more additional operations may be performed, without exceeding the scope of the methods described herein.

In operation 302, a request is received to track or monitor a person. The person may be identified by some form of his or her name, by an electronic mail address, by a user name or other identifier of a professional social networking site or other system that provides the personal name disambiguation service. For example, the requester may provide a link to the person's personal page on the site or system, or submit a social media post, message, or other content that is from or that identifies the person. The requester may also provide some information regarding the person (e.g., affiliations, interests, identifiers).

If the specific person is already being tracked, the additional request to monitor him or her may be recorded so that content items that reference him or her will also be provided to the new requester. The method may then terminate. Alternatively, additional information for disambiguating the person's name may be retrieved if it was not available before—such as information provided by the current requester—before terminating the process. Further, some processing described below may also be performed before terminating the process; for example, the categorization of the person's name may be updated or performed again.

In operation 304, the system or apparatus for disambiguating personal names determines the identity of, and various indicia regarding, the person. Thus, the person's profile(s) may be retrieved from one or more sites or services that he or she uses, other forms of his or her name may be learned, his or her affiliations and interests may be identified, etc. This operation is intended to obtain information that will allow the system or apparatus to disambiguate the use of the person's name so as to determine with some certainty that a particular reference to the name refers to this person and not to someone else with the same or similar name.

In operation 306, the person's name is categorized if it was not categorized previously. Illustratively, the name may already be monitored or tracked in response to one or more previous requests regarding the same and/or other requests to track him or her. Also, and as described above, a name's categorization may change. For example, the new request to track this name may cause it to be deemed a "common" name.

The categorization of operation 306, however, particularly deals with determining whether the name is or is not "famous." Thus, the system or apparatus may scan some number of past content items (or synopses or indicia of past items—such as personal names found in the items) to determine whether the name was mentioned at least a threshold number of times (e.g., 5,000, 1,000) in some predetermined period of time (e.g., 30 days, one week). In some implementations, the system or apparatus may maintain a running total of how many times some or all monitored names were mentioned in the most recent predetermined period of time, and change a name's categorization between "famous" and "non-famous" accordingly.

In operation 308, if the name was categorized as non-famous, it is further categorized as either "common" or "uncommon." In some implementations, this is determined by the number of people with the name that are being tracked. If the number meets or exceeds a threshold (e.g., 3, 10, 50), the name is deemed common; otherwise it is deemed uncommon.

In operation 310, a new content item is received. As new content items are constantly being received, operations 310-320 may be performed repeatedly.

In operation 312, some initial processing is performed on the content item, such as to identify a source (e.g., an author, a publisher), extract or convert content to text, change a form or format of the text, etc.

In operation 314, the item's content is scanned to identify one or more personal names of people that are tracked. If the item contains no personal names of tracked people, processing of the item may be aborted.

In operation 316, for each personal name that is found in the content item, a separate corresponding feature vector is assembled for each tracked person that has that name. Multiple forms of a name (e.g., full name, just first name, title and last name) found in the same item may be aggregated.

In some embodiments, feature vectors may be generated for some or all names that are tracked, even those not obviously mentioned in the content item. In these embodiments, therefore, a content item may be processed for a name not included in the item.

In operation 318, each feature vector is fed to the model corresponding to the type of name (e.g., famous, non-famous and common, non-famous and uncommon) represented by the vector. In an illustrative implementation, non-famous and uncommon names are disambiguated by a random forest model trained via supervised learning (e.g., using content items labeled manually or via a crowdsourcing application), non-famous and common names are disambiguated by a decision tree model that is hand-tuned, and famous names are disambiguated by some other process, which may be provided by a third party. In other implementations, a different combination of models is used for the different categories of names and/or names are categorized differently.

In some embodiments, the hand-tuned decision tree model used to disambiguate non-famous/common names yields a precision or accuracy of approximately 95%, meaning that approximately 95% of the content items that it reports as referencing or mentioning a particular person having a personal name shared with multiple people actually do reference that person, and a recall or comprehensiveness of approximately 45%, meaning that, on average, it correctly identifies 45% of all mentions of people being tracked. The random forest model, in these embodiments, yields a precision or accuracy of approximately 92% and a recall or comprehensiveness of approximately 90%.

In operation 320, results are received and, for each name found in the item that is successfully disambiguated to a particular person, the content item is made available to people who requested that person be tracked. In some implementations, a result of the application of a model to a feature vector representing one person with the name that is being disambiguated comprises an indication that the content item does (or does not) correspond to that one person, or a numerical value representing a likelihood or confidence that that person is (or is not) the correct person. In other implementations, a result comprises other information that is used to identify the correct person with the name, or to indicate that none of the known candidates is the correct person.

The method then ends.

Disambiguating Organization Names

Just as multiple people may share a personal name, multiple different organizations may share a name, such as businesses established in different cities, states, regions, or countries. Yet further, a business or other organization may share a name (or part of a name) with a common word or entity. Thus, in some embodiments, names of organizations are disambiguated by an apparatus or system such as system 110 of FIG. 1. Organizations whose names are disambiguated may include businesses, educational institutions, not-for-profit entities, government agencies and departments, and so on.

These embodiments may be implemented with or within a professional social network site or service, such as LinkedIn®. In such an environment, names of multitudinous organizations may be readily available, possibly including alternative spellings and/or name forms. A given embodiment may operate to disambiguate a reference to an organization that the disambiguation system has been requested to track or monitor, or the embodiment may operate to automatically track or monitor, and disambiguate references to, some or all known organizations (e.g., organizations identified by and/or associated with members or users of the system). Therefore, as new content items are received, the system may identify organizations mentioned in an item and, for each organization or just for specific organizations, may disambiguate references to the organization that are found in content items (e.g., social posts, news articles, messages, magazine stories).

If only one organization is known to have a particular name found in a content item, no disambiguation may be performed when its name is encountered; alternatively, some examination may be performed to verify that the reference is likely to target the one known organization.

In some embodiments, each organization name is disambiguated with the same machine-learning classification model (e.g., random forest, support vector machine, decision tree). In some other embodiments, organization names may be categorized (e.g., famous, non-famous, common, uncommon, large, medium, small), and different models may be applied to disambiguate different categories of names.

FIGS. 4A-B list some features that may be applied to disambiguate a name of an organization, according to some embodiments. Not all of the listed features need be included in every feature vector submitted to a machine-learning model used to disambiguate a name, and different subsets of the features may be used with different models. Other features not listed in FIGS. 4A-B may be employed without departing from the scope of the invention. The illustrative features therefore are not exhaustive. In addition, features of a similar nature and a method similar to those discussed in this document may be used to disambiguate names of additional types of entities other than organizations and people (e.g., places, things).

Table 400 of FIGS. 4A-B includes name features and affiliation features. Organization name features 410 encompass features that relate to the form or forms of an organization's name, while organization affiliation features 420 relate to an organization and its affiliations (e.g., employees, related organizations). Each feature is identified by feature name 402, data type 404, and description 406. A legend below the table explains the different data types.

As described in the previous section with regard to disambiguation of personal names, when a content item is received and processed to identify with confidence which organization(s), if any, are named in it, for each known organization (or just for organization names found within the item), feature vectors are composed using some or all of the features of Table 400, and a suitable model is applied to the vector to determine whether it should be deemed to refer to a particular organization, or to which organization having a particular name it refers.

Principal_name feature 410a and Alias_name feature 410b indicate whether the principal form and/or any alias forms of an organization's names are found in a content item, while Alias_count feature 410c reports the number of alias forms of the name that were found. Alias_similarity feature 410d measures the string similarity between an alias form of an organization's name that was found in the content item and the organization's principal or canonical name form, and may be calculated for each alias name form encountered. Stock_name 410e indicates, for a public company, whether its stock ticker symbol was found in the content item.

Name_encapsulated 410f indicates whether a form of the organization's name was found within a sequence of capitalized text. LI_similarity 410g measures the cosine similarity between a theme or topic of the content item and a description of an organization as maintained by the system (e.g., a professional social networking system) that performs disambiguation of organization names as described herein.

Submatch feature 410h indicates whether the matched string is a substring of the canonical organization name (e.g. "LinkedIn" is a substring of "LinkedIn Corporation"), while Submatch_count 410i identifies the number of unique submatches found, and Submatch_matchAvg feature 410j reports the average, over some or all submatches, of the submatch length divided by the length of the canonical organization name.

Others_name feature 410k identifies the number of other organizations, or the total number of organizations, that have the name that is currently being disambiguated. Name_dictionary 410l indicates whether the name is found in the dictionary (e.g., as an English word), and Name_frequency 410m is the commonality score of the name, which may measure or indicate a relative frequency of use of the current name in English text.

Name_words feature 410n identifies the number of words in the organization name being disambiguated, while Name_capital feature 410o indicates whether the words, as they appear in the content item, have uniform case (e.g., all letters capitalized, first letter of each word capitalized). Word_probabilities feature 410p reports the commonality of the organization name (as a word or group of words) in a random sample of documents, while Name_length 410q is a measure of the length (in characters) of the name, which may or may not include whitespace and/or punctuation.

Name_POS feature 410r identifies the part of (English) speech that the name is, as it appears in the content item, if it can be so classified. Domain_canonical 410s indicates whether the organization's domain name (e.g., of its website), if it has one, is the same as the organization's canonical name (e.g., after suffixes and top-level domains are stripped off). Y_boss feature 410t is the position of the company's web site in a list of search results returned by querying the company's name in a search engine. Matches_average feature 410u is the average number of content items examined by the system in a given past time period (e.g., day, week, month) that have been deemed to refer to or mention the organization.

Name_begin feature 410v indicates whether a form of the organization's name was found at the beginning of any sentence of text extracted from the content item, and Name_beginNum 410w identifies the number of sentences that began with the name. Similarly, Name_end feature 410x indicates whether a form of the organization's name was found at the end of any sentence of text extracted from the content item, and Name_endNum 410y identifies the number of sentences that ended with the name.

Within organization affiliation features 420, Top_name 420a indicates whether any leader or top person of an organization (e.g., a director, an officer, a key employee) was mentioned in the content item currently being processed. Because an embodiment may be applied within a professional social networking system, key people of some, most, or all known organizations have been identified and are known to the system.

ItemIndustry_distance feature 420b measures the graphical distance between content of the item and the industry of an organization whose name is currently being disambiguated. Related_found 420c indicates whether the names of any organizations related to an organization whose name is currently being disambiguated were found in the item. Site_found feature 420d indicates whether the name of a website associated with the organization was found, and/or whether a link to a website associated with the organization was found in the item. Site_familiarity 420e is a measure of the cosine similarity between the web site (or a website) of the organization and the content of the current item.

Org_size feature 420f indicates a size of the organization according to some metric (e.g., number of employees). Employee_similarity 420g is a measure of the cosine similarity between the content of the current item and the content of items known or deemed to mention an employee of (or a person associated with) the organization. Employee_industry 420h is a measure of the percentage of employees of an organization whose name is currently being disambiguated that are engaged in the industry that the content item is determined to discuss or address.

To train a model to disambiguate occurrences of organization names, a suitable number of content items (e.g., news stories, magazine articles, RSS feed items) may be labeled manually or with an appropriate tool, such as a crowdsourcing application. For example, approximately 40,000 articles that mention approximately 20,000 different organizations may be labeled and used to train one or more models. Thereafter, the selected model or models is/are used to disambiguate occurrences of organizations names located within newly received content items, in near real-time, so that those articles can be transmitted to interested persons, posted to a website or social media page associated with the corresponding organizations, and/or otherwise made available to interested people.

Figure 5:
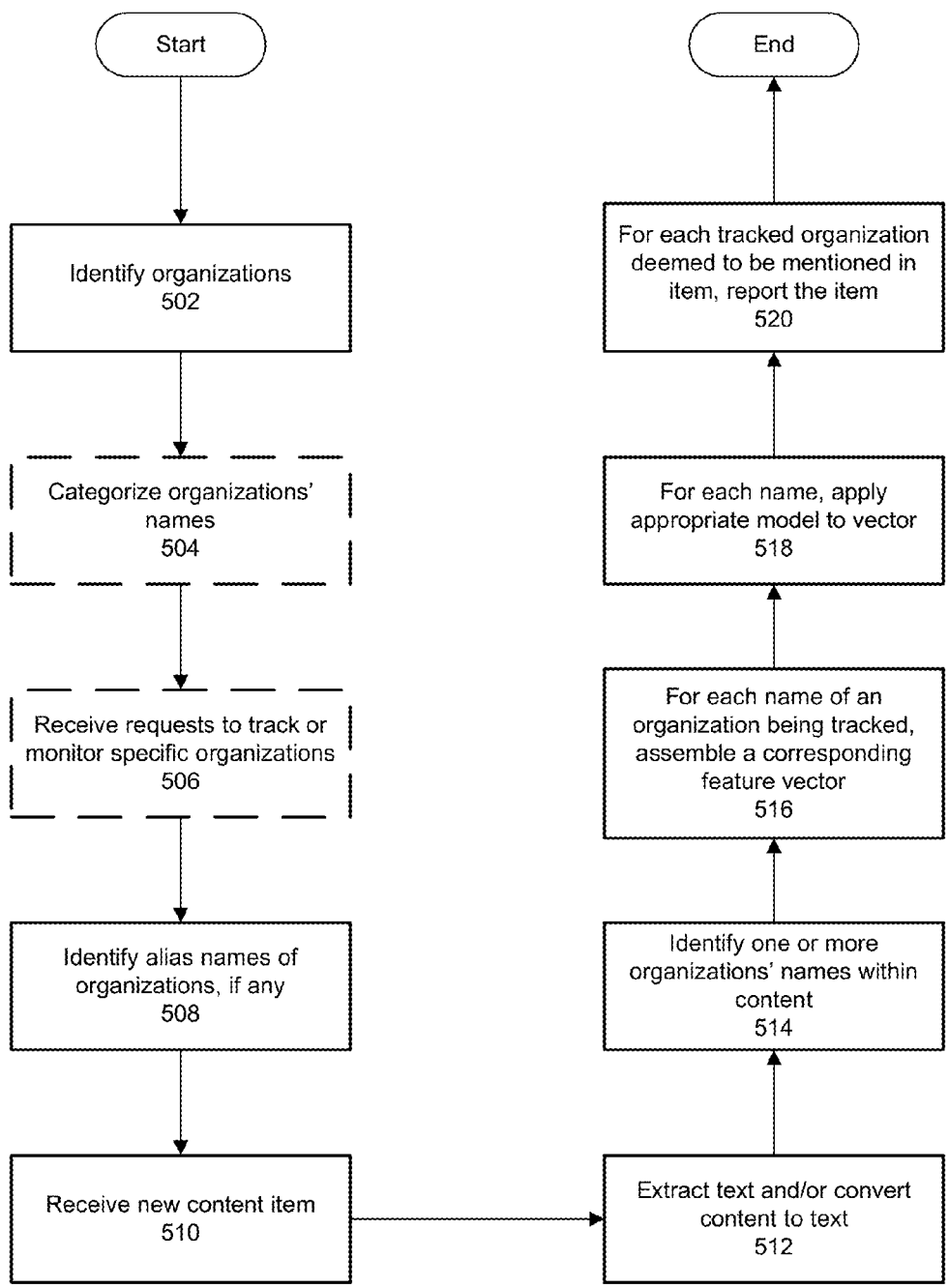
FIG. 5 is a flow chart demonstrating a method of disambiguating an occurrence of an organization name found in an electronic content item, in accordance with some embodiments.

FIG. 5 is a flow chart demonstrating a method of disambiguating an occurrence of an organization name found in an electronic content item, according to some embodiments. In the illustrated method, an organization name that appears in an electronic content item is disambiguated to identify, among multiple organizations that have the name, the particular organization that is referenced by or intended to be identified in the item.

In other embodiments, the illustrated operations may be performed in a different order, one or more operations may be omitted, some operations may be merged or further divided, and/or one or more additional operations may be performed, without exceeding the scope of the methods described herein.

In operation 502, a number of organizations are identified. In different implementations, the method may focus on specific types of organizations (e.g., top commercial businesses, not-for-profit concerns). In at least one implementation, however, names of some or all organizations known to a system that implements the method for disambiguating an organization name are collected.

For example, and as described previously, a professional social network site that has learned of myriad organizations (e.g., approximately 2 million) may implement this method or a similar method to disambiguate references to those organizations. Some organizations may be filtered out if desired (e.g., names of governmental entities).

In optional operation 504, the collected names may be categorized in some manner. For example, they may be divided into famous and non-famous categories and/or common and uncommon categories, as described in the previous section with relation to disambiguation of personal names. Also, or instead, organization names may be categorized according to their size (e.g., small, medium, large), their area of operation or influence (e.g., local, national, international, global), etc.

In optional operation 506, a request is received to track or monitor an organization, and that organization's name is added to the collection of names that are disambiguated (if the organization was not already in the collection). The nominated organization may be identified by some form of its principal or canonical name, by a network domain name, by a website, or by an identifier used within a professional social networking site that provides the name disambiguation service, or other system or service. For example, the requester may provide a link to the organization's page on the site or system, or submit a social media post, message, or other content that is from or that identifies the organization. The requester may also provide some information regarding the organization (e.g., affiliations, websites, industry).

In operation 508, aliases and other names by which the organizations may be referred to are learned. For example, a principal organization name such as "LinkedIn Corporation" may be deemed to have aliases that include other forms or formats of the principal name (e.g., "LinkedIn," "LinkedIn Corp."), misspellings (e.g., "LinkIn," "Linkedin"), names by which popular media sites refer to the organization, names or name forms used within the organization's own media (e.g., on its website(s)), etc. Illustratively, the aliases may be input from a database, a table, or other repository that is maintained by the system that is performing the disambiguation and/or by a cooperating system. Or, a collection of organization names/aliases may be received from an external entity.

Separately, or as part of operation 508, and to the extent not already known, the system may also learn of affiliates or affiliations of organizations (e.g., related organizations, subsidiaries, parent organizations), the organizations' industries, sizes, key people (e.g., officers, directors), websites, and so on. This information may help the system or apparatus that is performing the disambiguation to determine with some certainty that a particular reference to a name refers to a particular organization and not to another organization with the same or similar name.

In operation 510, a new content item is received. As new content items are constantly being received, operations 510-520 are repeatedly performed.

In operation 512, some initial processing is performed on the content item, such as to identify a source (e.g., an author, a publisher), extract or convert content to text, change a form or format of the text, etc.

In operation 514, the item's content is scanned to identify one or more organization names. If the item contains no such names, processing of the item may be aborted. In some implementations, an algorithm such as the Aho-Corasick algorithm may be used to search the item's content for one or more forms of the known organizations' names.

In operation 516, for each identified organization name that is found in the content item, a corresponding feature vector is assembled. Only one vector is needed for each unique name; multiple forms of a name (e.g., full name, just first name, title and last name) found in the same item may be aggregated. Alternatively, separate vectors may be assembled for different forms of what may be the same organization name.

In some embodiments, feature vectors are generated for some or all organizations that are tracked, even those not obviously mentioned in the content item. In these embodiments, therefore, a content item may be processed for a name not included in the item.

In operation 518, each feature vector is fed to the model that has been trained to differentiate organization names. In different embodiments, one model may be trained and applied for some or all organizations, or separate models may be trained and used for organizations of different types or categorizations.

In operation 520, results are received and, for each organization name found in the item that is successfully disambiguated to a particular organization, the content item is made available to people who requested that organization be tracked (e.g., by electronic mail), and/or is posted to a central location (e.g., a social media page). In some implementations, a result of the application of a model to a feature vector representing one organization with the name that is being disambiguated comprises an indication that the content item does (or does not) correspond to that one organization, or a numerical value representing a likelihood or confidence that that organization is (or is not) the correct organization. In other implementations, a result comprises other information that is used to identify the correct organization with the name, or to indicate that none of the known candidates is the correct organization.

The method then ends.

Figure 6:
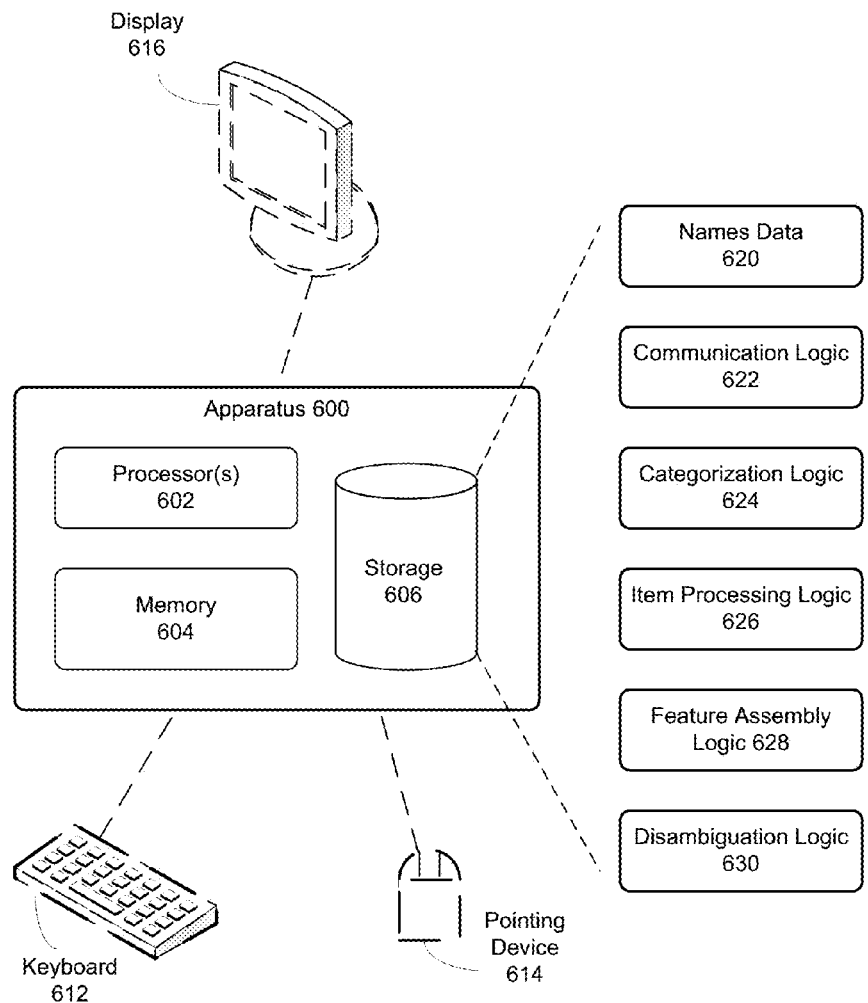
FIG. 6 is a block diagram of an apparatus for disambiguating a name of a person, an organization, and/or some other type of entity, in accordance with some embodiments.

FIG. 6 is a block diagram of an apparatus for disambiguating a name of a person, an organization, and/or some other type of entity, according to some embodiments.

Apparatus 600 of FIG. 6 includes processor(s) 602, memory 604, and storage 606, which may comprise one or more optical, solid-state, and/or magnetic storage components. Storage 606 may be local or remote to the apparatus. Apparatus 600 can be coupled (permanently or temporarily) to keyboard 612, pointing device 614, and display 616.

Multiple apparatuses 600 may store related or associated data, and cooperate to disambiguate references to or appearances of a particular name. For example, one apparatus may disambiguate names of one type of entity (e.g., persons), while another apparatus disambiguates names of another type of entity (e.g., organizations), or disambiguation efforts may be shared (e.g., load-balanced) among multiple apparatuses.

In addition to names data 620, which comprises names to be tracked/monitored and disambiguated (including some or all forms of the names, or just the principal or canonical form), storage 606 also stores logic that may be loaded into memory 604 for execution by processor(s) 602. Such logic includes communication logic 622, categorization logic 624, item processing logic 626, feature assembly logic 628, and disambiguation logic 630. In other embodiments, these logic modules may be combined or divided to aggregate or separate their functionality as desired.

Storage 606 and/or other storage components may also store other information to facilitate or support disambiguation. For example, content of processed content items (and/or the entire items) may be stored, records of items that were deemed to refer to (and/or not refer to) a particular name may be kept, the frequency of appearance of names may be monitored (e.g., to help categorize names), etc.

Communication logic 622 comprises processor-executable instructions for sending and/or receiving communications with users of the apparatus (e.g., people that request tracking of names), administrators, content item producers and suppliers (e.g., publishers, bloggers), and/or other entities. Thus, communication logic 622 may receive names to be tracked, information useful for disambiguating a name, and/or other information, and may transmit to interested parties content items that have been deemed to mention a particular entity having a name that was disambiguated (or information that enables such parties to access the content items).

Categorization logic 624 comprises processor-executable instructions for categorizing or classifying names. As described above, for example, personal names may be categorized in one manner (e.g., famous, non-famous and common, non-famous and uncommon), and organization names may be categorized in some other manner (e.g., according to size, according to area(s) of operation). Names of other types of entities may be categorized in some other manner.

Item processing logic 626 comprises processor-executable instructions for processing a content item. Such processing may include extracting textual content and/or converting content into text, translation of content from one language to another, parsing, re-formatting content into a common format, identifying names that appear in the item, and so on.

Feature assembly logic 628 comprises processor-executable instructions for generating feature vectors for names found in a content item (and possibly other names being tracked). As described above, any number of features may be configured and assembled into a vector, depending upon the type of entity that is named, the model or models that will apply the vector, and/or other factors. Feature assembly logic 628 may rely on work performed by item processing logic 626 and/or may parse, analyze, and/or otherwise process a content item to obtain the information necessary to generate the desired vector values. Features used in different embodiments of the invention are not limited to those enumerated above.

Disambiguation logic 630 comprises processor-executable instructions for disambiguating an appearance of or reference to a name, among multiple entities that share the name. In some embodiments, this logic includes a model that has been trained or configured appropriately, or possibly multiple models, each of which is applied to a different type of name (e.g., personal name, organization name) and/or a different category of names (e.g., famous, non-famous and common, national, local).

In some embodiments, apparatus 600 performs some or all of the functions ascribed to one or more components of system 110 of FIG. 1, such as content processor 120.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method of disambiguating organization names, the method comprising:
    selecting multiple names of organizations; and
    using the computer to:
        extract a first name identified in an electronic content item, wherein multiple different organizations have the first name;
        for each of the multiple organizations, assemble a corresponding feature vector comprising:
            a set of name features reflecting use of the first name in the electronic content item; and
            a set of affiliation features reflecting one or more affiliations of the organization also identified in the electronic content item;
        execute a model to identify, among the multiple organizations, only one organization to which the electronic content item refers; and
        make the electronic content item available to a user interested in content items that reference the one organization.

2. The method of claim 1, wherein executing a model comprises, for each organization in the multiple organizations:
    applying the model to the organization's corresponding feature vector; and
    receiving as output from the model an indication as to whether the first name refers to the organization.

3. The method of claim 2, wherein the set of affiliation features comprises:
    for each of one or more types of affiliations, an indication whether the electronic content item references the affiliation; and
    an indication whether the electronic content item references a leader of the organization.

4. The method of claim 2, wherein the set of name features comprises:
    a first alias feature indicating whether any alias forms of the name of the organization appear in the electronic content item; and
    a second alias feature indicating a number of alias forms of the name of the organization that appear in the electronic content item.

5. The method of claim 4, wherein the set of name features further comprises:
    if the organization is a commercial business, an indication whether a stock symbol of the organization appears in the electronic content item; and
    a cosine similarity calculated between a theme of the electronic content item and a description of the organization at the professional social networking site.

6. The method of claim 1, wherein each organization's corresponding feature vector further comprises:
    a set of wrongness features derived from correlation of the electronic content item with one or more other content items known to not reference the organization.

7. The method of claim 1, further comprising categorizing the multiple names by, for each name:
    identifying a total number of references to the name among multiple content items received during a threshold period of time, other than the electronic content item; and
    if the total number of references exceeds a threshold quantity, categorizing the name as famous.

8. The method of claim 1, further comprising categorizing the multiple names by, for each name:
    determining the number of organizations in the multiple organizations;
    categorizing the name as common if the number of organizations is greater than a threshold; and
    categorizing the name as uncommon if the number of organizations is less than the threshold.

9. The method of claim 1, further comprising:
    categorizing each of the multiple names;
    wherein executing a model comprises executing a model associated with a category assigned to the first name.

10. An apparatus for disambiguating organization names, the apparatus comprising:
    one or more processors; and
    logic comprising instructions that, when executed by the one or more processors, cause the apparatus to:
        select multiple names of organizations;
        extract a first name identified in an electronic content item, wherein multiple different organizations have the first name;
        for each of the multiple organizations, assemble a corresponding feature vector comprising:
            a set of name features reflecting use of the first name in the electronic content item; and
            a set of affiliation features reflecting one or more affiliations of the organization also identified in the electronic content item;
        execute a model to identify, among the multiple organizations, only one organization to which the electronic content item refers; and
        make the electronic content item available to a user interested in content items that reference the one organization.

11. The apparatus of claim 10, wherein executing a model comprises, for each organization in the multiple organizations:
    applying the model to the organization's corresponding feature vector; and
    receiving as output from the model an indication as to whether the first name refers to the organization.

12. The apparatus of claim 11, wherein the set of affiliation features comprises:
    for each of one or more types of affiliations, an indication whether the electronic content item references the affiliation; and an indication whether the electronic content item references a leader of the organization.

13. The apparatus of claim 11, wherein the set of name features comprises:
 a first alias feature indicating whether any alias forms of the name of the organization appear in the electronic content item; and
 a second alias feature indicating a number of alias forms of the name of the organization that appear in the electronic content item.

14. The apparatus of claim 13, wherein the set of name features further comprises:
 if the organization is a commercial business, an indication whether a stock symbol of the organization appears in the electronic content item; and
 a cosine similarity calculated between a theme of the electronic content item and a description of the organization at the professional social networking site.

15. The apparatus of claim 10, wherein each organization's corresponding feature vector further comprises:
 a set of wrongness features derived from correlation of the electronic content item with one or more other content items known to not reference the organization.

16. The apparatus of claim 10, wherein the logic further comprises instructions that, when executed by the one or more processors, cause the apparatus to categorize the multiple names by, for each name:
 identifying a total number of references to the name among multiple content items received during a threshold period of time, other than the electronic content item; and
 if the total number of references exceeds a threshold quantity, categorizing the name as famous.

17. The apparatus of claim 10, wherein the logic further comprises instructions that, when executed by the one or more processors, cause the apparatus to categorize the multiple names by, for each name:
 determining the number of organizations in the multiple organizations;
 categorizing the name as common if the number of organizations is greater than a threshold; and
 categorizing the name as uncommon if the number of organizations is less than the threshold.

18. The apparatus of claim 10, wherein the logic further comprises instructions that, when executed by the one or more processors, cause the apparatus to:
 categorize each of the multiple names;
 wherein executing a model comprises executing a model associated with a category assigned to the first name.

19. A system for disambiguating organization names, comprising:
 a physical storage device storing multiple names of organizations;
 one or more processors;
 logic comprising instructions that, when executed by the one or more processors, cause the system to:
  select multiple names of organizations;
  extract a first name identified in an electronic content item, wherein multiple different organizations have the first name;
  for each of the multiple organizations, assemble a corresponding feature vector comprising:
   a set of name features reflecting use of the first name in the electronic content item; and
   a set of affiliation features reflecting one or more affiliations of the organization also identified in the electronic content item;
  execute a model to identify, among the multiple organizations, only one organization to which the electronic content item refers; and
  make the electronic content item available to a user interested in content items that reference the one organization.

20. The system of claim 19, further comprising a professional social networking site.

* * * * *